US012503537B2

(12) United States Patent
Yu et al.

(10) Patent No.: US 12,503,537 B2
(45) Date of Patent: Dec. 23, 2025

(54) METHOD FOR CONTROLLING MOONEY VISCOSITY OF PEROXIDE-CURABLE FLUORORUBBER

(71) Applicant: Zhonghao Chenguang Research Institute of Chemical Industry Co., Ltd., Zigong (CN)

(72) Inventors: Jinlong Yu, Zigong (CN); Bo Liu, Zigong (CN); Ziqiang Zhong, Zigong (CN); Tingjian Zhang, Zigong (CN); Zhongliang Xiao, Zigong (CN)

(73) Assignee: ZHONGHAO CHENGUANG RESEARCH INSTITUTE OF CHEMICAL INDUSTRY CO., LTD., Zigong (CN)

( * ) Notice: Subject to any disclaimer, the term of this patent is extended or adjusted under 35 U.S.C. 154(b) by 975 days.

(21) Appl. No.: 17/638,105

(22) PCT Filed: Aug. 17, 2020

(86) PCT No.: PCT/CN2020/109529
§ 371 (c)(1),
(2) Date: Feb. 24, 2022

(87) PCT Pub. No.: WO2022/000725
PCT Pub. Date: Jan. 6, 2022

(65) Prior Publication Data
US 2022/0298278 A1    Sep. 22, 2022

(30) Foreign Application Priority Data
Jun. 30, 2020    (CN) .......................... 202010619099.9

(51) Int. Cl.
C08F 214/22    (2006.01)
C08F 2/22    (2006.01)
C08F 2/24    (2006.01)
C08F 4/30    (2006.01)
C08F 4/34    (2006.01)
C08F 14/22    (2006.01)
C08K 5/14    (2006.01)

(52) U.S. Cl.
CPC .............. C08F 214/22 (2013.01); C08F 4/30 (2013.01); C08F 4/34 (2013.01)

(58) Field of Classification Search
CPC .......... C08F 14/18; C08F 2/16; C08F 214/22; C08F 4/34; C08F 2/24; C08F 14/22; C08F 2/22; C08K 5/14
See application file for complete search history.

(56) References Cited

U.S. PATENT DOCUMENTS 6,458,883 B1    10/2002    Takashima et al.

FOREIGN PATENT DOCUMENTS

| CN | 1687148 A | 10/2005 |
| CN | 101081887 A | 12/2007 |
| CN | 101186662 A | 5/2008 |
| CN | 101195669 A | 6/2008 |
| CN | 102443090 A | 5/2012 |
| CN | 102786700 A | 11/2012 |

OTHER PUBLICATIONS

International Search Report in connection with International Application No. PCT/CN2020/109529 filed Aug. 17, 2020.
Dong Jin et al., "Advances in Production Modification and Processing Technology of Fluororubber," Organo-Fluorine Industry, No. 3, Sep. 30, 2009, pp. 48-51.

Primary Examiner — Catherine S Branch
(74) Attorney, Agent, or Firm — John P. White

(57) ABSTRACT

The present invention provides a method for controlling Mooney viscosity of peroxide-cured fluororubber. The method comprises: adding an initiator solution in a continuous supplementary manner during the emulsion polymerization process of a peroxide-cured fluororubber until 5 to 10 minutes before the end of the polymerization reaction; wherein the amount of the initiator solution added initially is 0.1% to 0.5% of the total amount of the polymerization monomer dry materials, and the amount of the initiator solution continuously supplemented is 0.1% to 2% of the total amount of the polymerization monomer dry materials, based on the initiator. The present invention effectively controls the Mooney viscosity value of the peroxide-cured fluororubber within the desired range with small fluctuations by controlling the amount and the manner of addition of the initiator, thereby obtaining a peroxide-cured fluororubber with stable and controllable quality. Moreover, the present invention does not need to add a chain transfer agent, which reduces the amount of additives in the polymerization process, and meanwhile improves the reaction activity of the polymerization system, effectively shortens the time for polymerization, and is beneficial to industrialized production.

20 Claims, No Drawings

METHOD FOR CONTROLLING MOONEY VISCOSITY OF PEROXIDE-CURABLE FLUORORUBBER

CROSS-REFERENCE TO RELATED APPLICATIONS

This application is a § 371 national stage of PCT International Application No. PCT/CN2020/109529, filed Aug. 17, 2020, and claims the priority of Chinese patent application No. 202010619099.9, filed Jun. 30, 2020, the contents of each of which hereby incorporated herein by reference in its entirety.

TECHNICAL FIELD

The present invention relates to the field of fluorochemical industry, and more specifically, to a method for controlling the Mooney viscosity of peroxide-cured fluororubber.

BACKGROUND ART

Fluororubber refers to a synthetic polymer elastomer containing fluorine atoms bonded to the carbon atoms of the main chain or side chain. The fluororubber cured with organic peroxides (or free radicals) is called peroxide-cured fluororubber. At present, the application of processing of the peroxide-cured fluororubber can be divided into extrusion processing and molding processing and the like. The Mooney viscosity of the peroxide-cured fluororubber is about 20 to 70, and the requirements for Mooney viscosity are different according to different application fields.

At present, the polymerization method of the peroxide-cured fluororubber is mainly emulsion polymerization. The general operation is as follows: adding additives such as emulsifier and pH buffer into water, adding polymerization monomers to form an emulsion, adding an initiator and a chain transfer agent to react at certain temperature and pressure to obtain an elastomer emulsion, then adding a coagulant to perform coagulation, washing, and drying, wherein the initiator commonly used is an inorganic initiator, polymerization monomers will be supplemented in order to keep the pressure constant during the reaction, and the initiator will also be supplemented once or twice when the initiation rate is low.

However, the Mooney viscosity of the peroxide-cured fluororubber prepared by the existing emulsion polymerization is not stable. As a result of the same reaction conditions, the Mooney viscosity value may fluctuate within ±25, and the time for polymerization is also long, which is not conducive to industrialized production.

SUMMARY OF THE INVENTION

For the deficiencies in the prior art, the present invention provides a method for controlling the Mooney viscosity of peroxide-cured fluororubber.

As an example, the present invention provides a method for controlling the Mooney viscosity of peroxide-cured fluororubber, comprising:

adding an initiator solution in a continuous supplementary manner during an emulsion polymerization process of a peroxide-cured fluororubber until 5 to 10 minutes before the end of the polymerization reaction;

wherein the amount of the initiator solution added initially is 0.1% to 0.5% of the total amount of the polymerization monomer dry materials, and the amount of the initiator solution continuously supplemented is 0.1% to 2% of the total amount of the polymerization monomer dry materials, based on the initiator.

In the above technical solution, the total amount of the polymerization monomer dry materials refers to the total amount of all polymerization monomers added during the entire emulsion polymerization process based on dry materials.

Through extensive research and pilot tests, the inventor surprisingly found that the Mooney viscosity of the peroxide-cured fluororubber can be effectively controlled within desired quality (20 to 70) with fluctuations not exceeding ±5 by changing the amount and the manner of addition of the initiator during the polymerization process of a peroxide-cured fluororubber emulsion, that is, the existing manner of one-step addition at initial stage is changed to the manner of adding a part initially and supplementing the rest continuously until approximating the end of the reaction. Moreover, a chain transfer agent can be omitted in the present invention, thereby reducing the amount of additives, saving costs, and meanwhile improving the reactivity of the polymerization system, effectively shortening the time for polymerization, which is beneficial to industrialized production.

The control method proposed by the present invention is basically applicable to all situations where organic peroxides (or free radicals) are used to cure fluororubber, and is not limited by polymerization monomers. Preferably, the polymerization monomers may be two or more of vinylidene fluoride, chlorotrifluoroethylene, tetrafluoroethylene, and hexafluoropropylene. Specifically, it can be the polymerization of vinylidene fluoride and chlorotrifluoroethylene, the polymerization of vinylidene fluoride and hexafluoropropylene, the polymerization of vinylidene fluoride, tetrafluoroethylene and hexafluoropropylene, and the like.

Further, the initiator solution is an aqueous solution of the initiator, with a concentration of 1% to 8%, preferably 1% to 5%. At this concentration, it can be ensured that the reaction is initiated efficiently, and the reaction rate will not be out of control due to excessively high concentration and addition rate.

Further, the temperature of deionized water is adjusted to 25° C. to 35° C. when preparing the initiator solution. The temperature will affect the solubility and the subsequent initiation effect of the initiator. If the temperature is too high, the initiator will dissolve and disperse better in the solution, but the initiator will decompose in advance. If the temperature is too low, the solubility of the initiator in the solution will decrease, the dispersion effect will be poor, and the initiator decomposes less, which will affect the control of the concentration of the initiator added. Further preferably, the temperature of deionized water is controlled to be 25° C. to 32° C., which is more conducive to the dissolution of the initiator and reducing the decomposition of the initiator.

Further, the initiator is ammonium persulfate and/or potassium persulfate, preferably a compound initiator consisting of ammonium persulfate and potassium persulfate at a mass ratio of (2-5):1.

Further, the emulsion polymerization is performed at a temperature of 90° C. to 95° C. under a pressure of 2.1 MPa to 2.5 MPa.

In a preferred embodiment of the present invention, the amount of the initiator solution added initially is 0.1% to 0.5% of the total amount of the polymerization monomer dry materials, and the amount of the initiator solution continuously supplemented is 0.1% to 0.3% of the total amount of the polymerization monomer dry materials, based on the initiator.

In the above technical solutions, the amount of the initiator solution added initially (based on the initiator) is controlled to be 0.1% to 0.5% of the total amount of the polymerization monomer dry materials, which can effectively control the chain initiation, and in combination with the above control, the amount of the initiator solution continuously supplemented (based on the initiator) is controlled to be 0.1% to 0.3% of the total amount of the polymerization monomer dry materials, so that the Mooney viscosity of peroxide-cured fluororubber in the range of 60 to 70 can be finally realized.

In another preferred embodiment of the present invention, the amount of the initiator solution added initially is 0.1% to 0.5% of the total amount of the polymerization monomer dry materials, and the amount of the initiator solution continuously supplemented is 0.3% to 0.8% of the total amount of the polymerization monomer dry materials, based on the initiator.

In this embodiment, the Mooney viscosity of the obtained peroxide-cured fluororubber can be controlled to be 50 to 60.

In another preferred embodiment of the present invention, the amount of the initiator solution added initially is 0.1% to 0.5% of the total amount of the polymerization monomer dry materials, and the amount of the initiator solution continuously supplemented is 0.8% to 1.2% of the total amount of the polymerization monomer dry materials, based on the initiator. In this embodiment, the Mooney viscosity of the obtained peroxide-cured fluororubber can be controlled to be 40 to 50.

In another preferred embodiment of the present invention, the amount of the initiator solution added initially is 0.1% to 0.5% of the total amount of the polymerization monomer dry materials, and the amount of the initiator solution continuously supplemented is 1.2% to 1.5% of the total amount of the polymerization monomer dry materials, based on the initiator. In this embodiment, the Mooney viscosity of the obtained peroxide-cured fluororubber can be controlled to be 30 to 40.

In another preferred embodiment of the present invention, the amount of the initiator solution added initially is 0.1% to 0.5% of the total amount of the polymerization monomer dry materials, and the amount of the initiator solution continuously supplemented is 1.5% to 2.0% of the total amount of the polymerization monomer dry materials, based on the initiator. In this embodiment, the Mooney viscosity of the obtained peroxide-cured fluororubber to be 20 to 30.

The beneficial effects of the present invention are as follows:

The present invention effectively controls the Mooney viscosity value of the peroxide-cured fluororubber within the desired range with small fluctuations by controlling the amount and the manner of addition of the initiator, thereby obtaining a peroxide-cured fluororubber with stable and controllable quality. Moreover, the present invention does not need to add a chain transfer agent, which reduces the amount of additives in the polymerization process, and meanwhile improves the reactivity of the polymerization system, effectively shortens the time for polymerization, and is beneficial to industrialized production.

SPECIFIC MODES FOR CARRYING OUT THE EMBODIMENTS

The following Examples are used to illustrate the present invention, but not to limit the scope of the present invention. If the specific technology or conditions are not indicated in the Examples, it shall be carried out according to the technology or conditions described in the documents in the art or according to the product specification. The reagents or instruments used without the manufacturer indicated are conventional products that can be purchased through formal channels.

In the following Examples, the involved concentrations are all mass concentrations.

The Mooney viscosity is measured according to GB/T 1232.1-2000, i.e. Rubber, unvulcanized—Determinations using a shearing-disc viscometer.

Example 1

The present Example provides a method for preparing a peroxide-cured fluororubber, comprising the following steps:

Firstly, an inorganic initiator (ammonium persulfate) was dissolved in deionized water at 30° C. to prepare an initiator solution with a concentration of 2%.

30 L of deionized water, 35 g of a pH buffer, and 30 g of an emulsifier were added to a reaction kettle, the reaction kettle was vacuumized, and the temperature in the kettle was raised to 90° C.

A polymerization monomer A (vinylidene fluoride) and a polymerization monomer B (chlorotrifluoroethylene) were added to the reaction kettle until the pressure in the kettle reached 2.3 MPa, and 600 g of the initiator solution (that is, the amount of the initiator added initially was 12 g) was added to initiate the polymerization reaction, during which the polymerization monomer A and the polymerization monomer B were appropriately supplemented to maintain the pressure in the kettle;

During the reaction process, the initiator solution was continuously supplemented until 10 minutes before the end of the reaction;

The time for polymerization reaction was 2.5 h, the initiator solution continuously supplemented was 1100 g (that is, the amount of the initiator continuously supplemented was 22 g), and the total amount of polymerization monomer dry materials added in the entire reaction process was 11 kg;

An elastomer emulsion was obtained, a coagulant was added for coagulation, and washing and vacuum drying were performed to finally obtain 9.8 kg of peroxide-cured fluororubber with a Mooney viscosity of 65.

Example 2

The present Example provides a method for preparing a peroxide-cured fluororubber, which is the same as that of Example 1 except that the inorganic initiator was potassium persulfate, which was formulated into an initiator solution with a concentration of 5%;

the amount of the initiator added initially was 25 g, the amount of the initiator continuously supplemented was 18 g, and the total amount of polymerization monomer dry materials added during the whole reaction process was 11.2 kg; and during the emulsion polymerization process, the polymerization temperature was 92° C., the pressure was 2.4M Pa, and the time for polymerization reaction was 2.5 h.

Finally, 9.7 kg of peroxide-cured fluororubber with a Mooney viscosity of 63 was obtained.

Example 3

The present Example provides a method for preparing a peroxide-cured fluororubber, which is the same as that of Example 1 except that the inorganic initiator was a mixture of ammonium persulfate and potassium persulfate at a mass ratio of 2:1, which was formulated into an initiator solution with a concentration of 6%;
  the amount of the initiator added initially was 26 g, the amount of the initiator continuously supplemented was 14 g, and the total amount of polymerization monomer dry materials added during the whole reaction process was 10.8 kg; and
  during the emulsion polymerization process, the polymerization temperature was 94° C., the pressure was 2.4 MPa, and the time for polymerization reaction was 2.4 h.

Finally, 9.5 kg of peroxide-cured fluororubber with a Mooney viscosity of 68 was obtained.

Example 4

The present Example provides a method for preparing a peroxide-cured fluororubber, which is the same as that of Example 1 except that the amount of the initiator added initially was 35 g, the amount of the initiator continuously supplemented was 42 g, and the total amount of polymerization monomer dry materials added during the whole reaction process was 10.0 kg; and
  during the emulsion polymerization process, the polymerization temperature was 90° C., the pressure was 2.3 MPa, and the time for polymerization reaction was 2.2 h.

Finally, 9.2 kg of peroxide-cured fluororubber with a Mooney viscosity of 53 was obtained.

Example 5

The present Example provides a method for preparing a peroxide-cured fluororubber, which is the same as that of Example 1 except that the inorganic initiator was potassium persulfate, which was formulated into an initiator solution with a concentration of 5%;
  the amount of the initiator added initially was 14 g, the amount of the initiator continuously supplemented was 65 g, and the total amount of polymerization monomer dry materials added during the whole reaction process was 11.6 kg; and during the emulsion polymerization process, the polymerization temperature was 92° C., the pressure was 2.4 MPa, and the time for polymerization reaction was 2.4 h.

Finally, 9.9 kg of peroxide-cured fluororubber with a Mooney viscosity of 57 was obtained.

Example 6

The present Example provides a method for preparing a peroxide-cured fluororubber, which is the same as that of Example 1 except that the inorganic initiator was a mixture of ammonium persulfate and potassium persulfate at a mass ratio of 3:1, which was formulated into an initiator solution with a concentration of 6%;
  the amount of the initiator added initially was 44 g, the amount of the initiator continuously supplemented was 70 g, and the total amount of polymerization monomer dry materials added during the whole reaction process was 10.9 kg; and
  during the emulsion polymerization process, the polymerization temperature was 94° C., the pressure was 2.4 MPa, and the time for polymerization reaction was 2.8 h.

Finally, 9.3 kg of peroxide-cured fluororubber with a Mooney viscosity of 54 was obtained.

Example 7

The present Example provides a method for preparing a peroxide-cured fluororubber, which is the same as that of Example 1 except that the inorganic initiator was ammonium persulfate, which was formulated into an initiator solution with a concentration of 3%;
  the amount of the initiator added initially was 18 g, the amount of the initiator continuously supplemented was 96 g, and the total amount of polymerization monomer dry materials added during the whole reaction process was 11.8 kg; and
  during the emulsion polymerization process, the polymerization temperature was 90° C., the pressure was 2.3 MPa, and the time for polymerization reaction was 2.6 h.

Finally, 9.8 kg of a peroxide-cured fluororubber with a Mooney viscosity of 46 was obtained.

Example 8

The present Example provides a method for preparing a peroxide-cured fluororubber, which is the same as that of Example 1 except that the inorganic initiator was potassium persulfate, which was formulated into an initiator solution with a concentration of 6%;
  the amount of the initiator added initially was 42 g, the amount of the initiator continuously supplemented was 98 g, and the total amount of polymerization monomer dry materials added during the whole reaction process was 11.5 kg; and
  during the emulsion polymerization process, the polymerization temperature was 92° C., the pressure was 2.4 MPa, and the time for polymerization reaction was 3.0 h.

Finally, 9.6 kg of peroxide-cured fluororubber with a Mooney viscosity of 48 was obtained.

Example 9

The present Example provides a method for preparing a peroxide-cured fluororubber, which is the same as that of Example 1 except that the inorganic initiator was a mixture of ammonium persulfate and potassium persulfate at a mass ratio of 4:1, which was formulated into an initiator solution with a concentration of 6%;
  the amount of the initiator added initially was 25 g, the amount of the initiator continuously supplemented was 110 g, and the total amount of polymerization monomer dry materials added during the whole reaction process was 11.7 kg; and
  during the emulsion polymerization process, the polymerization temperature was 90° C., the pressure was 2.4 MPa, and the time for polymerization reaction was 2.8 h.

Finally, 9.8 kg of peroxide-cured fluororubber with a Mooney viscosity of 41 was obtained.

Example 10

The present Example provides a method for preparing a peroxide-cured fluororubber, which is the same as that of Example 1 except that the amount of the initiator added initially was 12 g, the amount of the initiator continuously supplemented was 140 g, and the total amount of polymerization monomer dry materials added during the whole reaction process was 11.0 kg; and
during the emulsion polymerization process, the polymerization temperature was 90° C., the pressure was 2.3 MPa, and the time for polymerization reaction was 2.6 h.
Finally, 9.8 kg of peroxide-cured fluororubber with a Mooney viscosity of 35 was obtained.

Example 11

The present Example provides a method for preparing a peroxide-cured fluororubber, which is the same as that of Example 1 except that the inorganic initiator was potassium persulfate, which was formulated into an initiator solution with a concentration of 5%;
the amount of the initiator added initially was 39 g, the amount of the initiator continuously supplemented was 138 g, and the total amount of polymerization monomer dry materials added during the whole reaction process was 11.2 kg; and
during the emulsion polymerization process, the polymerization temperature was 92° C., the pressure was 2.3 MPa, and the time for polymerization reaction was 2.7 h.
Finally, 9.6 kg of peroxide-cured fluororubber with a Mooney viscosity of 33 was obtained.

Example 12

The present Example provides a method for preparing a peroxide-cured fluororubber, which is the same as that of Example 1 except that the inorganic initiator was a mixture of ammonium persulfate and potassium persulfate at a mass ratio of 4:1, which was formulated into an initiator solution with a concentration of 6%;
the amount of the initiator added initially was 29 g, the amount of the initiator continuously supplemented was 150 g, and the total amount of polymerization monomer dry materials added during the whole reaction process was 11.3 kg; and
during the emulsion polymerization process, the polymerization temperature was 94° C., the pressure was 2.4 MPa, and the time for polymerization reaction was 2.5 h.
Finally, 9.5 kg of peroxide-cured fluororubber with a Mooney viscosity of 38 was obtained.

Example 13

The present Example provides a method for preparing a peroxide-cured fluororubber, which is the same as that of Example 1 except that the inorganic initiator was ammonium persulfate, which was formulated into an initiator solution with a concentration of 3%;
the amount of the initiator added initially was 22 g, the amount of the initiator continuously supplemented was 180 g, and the total amount of polymerization monomer dry materials added during the whole reaction process was 11.8 kg; and
during the emulsion polymerization process, the polymerization temperature was 90° C., the pressure was 2.3 MPa, and the time for polymerization reaction was 2.3 h.
Finally, 9.8 kg of a peroxide-cured fluororubber with a Mooney viscosity of 22 was obtained.

Example 14

The present Example provides a method for preparing a peroxide-cured fluororubber, which is the same as that of Example 1 except that the inorganic initiator was potassium persulfate, which was formulated into an initiator solution with a concentration of 6%;
the amount of the initiator added initially was 35 g, the amount of the initiator continuously supplemented was 192 g, and the total amount of polymerization monomer dry materials added during the whole reaction process was 11.6 kg; and
during the emulsion polymerization process, the polymerization temperature was 92° C., the pressure was 2.4 MPa, and the time for polymerization reaction was 2.5 h.
Finally, 9.8 kg of a peroxide-cured fluororubber with a Mooney viscosity of 27 was obtained.

Example 15

The present Example provides a method for preparing a peroxide-cured fluororubber, which is the same as that of Example 1 except that the inorganic initiator was a mixture of ammonium persulfate and potassium persulfate at a mass ratio of 2:1, which was formulated into an initiator solution with a concentration of 6%;
the amount of the initiator added initially was 36 g, the amount of the initiator continuously supplemented was 185 g, and the total amount of polymerization monomer dry materials added during the whole reaction process was 11.7 kg; and
during the emulsion polymerization process, the polymerization temperature was 94° C., the pressure was 2.2 MPa, and the time for polymerization reaction was 2.8 h.
Finally, 9.5 kg of a peroxide-cured fluororubber with a Mooney viscosity of 28 was obtained.

For intuitive comparison, the time for polymerization, the Mooney viscosity and the initiator ratio of each Example are listed in Table 1.

TABLE 1

Time for Polymerization, Mooney viscosity and initiator ratio of each Example

| | Time for Polymerization (h) | Ratio of supplemented initiator to polymerization monomers (%) | Mooney viscosity (MU) |
|---|---|---|---|
| Example 1 | 2.5 | 0.1-0.3 | 65 |
| Example 2 | 2.5 | | 63 |
| Example 3 | 2.4 | | 68 |
| Example 4 | 2.2 | 0.3-0.8 | 53 |
| Example 5 | 2.4 | | 57 |
| Example 6 | 2.8 | | 54 |
| Example 7 | 2.6 | 0.8-1.2 | 46 |
| Example 8 | 3.0 | | 48 |
| Example 9 | 2.8 | | 41 |
| Example 10 | 2.6 | 1.2-1.5 | 35 |
| Example 11 | 2.7 | | 33 |
| Example 12 | 2.5 | | 38 |
| Example 13 | 2.3 | 1.5-2.0 | 22 |
| Example 14 | 2.5 | | 27 |
| Example 15 | 2.8 | | 28 |

It can be seen from the above results that, when using the methods of the Examples of the present invention, the Mooney viscosity value of peroxide-cured fluororubber can be effectively controlled within a certain range by adjusting the amount of initiator continuously supplemented: when the mass ratio of supplemented initiator to polymerization monomers is (0.1-0.3)%, the Mooney viscosity value range is controlled to be 60 to 70; when the mass ratio of supplemented initiator to polymerization monomers is (0.3-0.8)%, the Mooney viscosity value range is controlled to be 50 to 60; when the mass ratio of supplemented initiator to polymerization monomers is (0.8-1.2)%, the Mooney viscosity value range is controlled to be 40 to 50; when the mass ratio of supplemented initiator to polymerization monomers is (1.2-1.5)%, the Mooney viscosity value range is controlled to be 30 to 40; and when the mass ratio of supplemented initiator to polymerization monomers is (1.5-2.0)%, the Mooney viscosity value range is controlled to be 20 to 30.

Comparative Example 1

Compared with Example 1, Comparative Example 1 was different in that the initiator was added at one time, and the additive amount of the initiator was 34 g. As a result, the time for polymerization reaction was 4.5 h, and the Mooney viscosity was 89. It can be seen that the Mooney viscosity value is beyond the controlled range, and the time for polymerization is longer, which is not conducive to industrialized production.

Comparative Example 2

The present Comparative Example provides a method for preparing a peroxide-cured fluororubber, which was specifically carried out as follows: 30 L of deionized water, 35 g of pH buffer, and 30 g of emulsifier were added to a reaction kettle, the reaction kettle was vacuumized, and the temperature in the kettle was raised to 90° C.

A polymerization monomer A (vinylidene fluoride) and a polymerization monomer B (chlorotrifluoroethylene) were added to the reaction kettle until the pressure in the kettle reached 2.3 MPa, 32 g of diethyl malonate as the chain transfer agent was added, and 48 g of the initiator was added to initiate the polymerization reaction, during which the polymerization monomer A and the polymerization monomer B were appropriately supplemented to maintain the pressure in the kettle.

The polymerization reaction time was 3.5 h, and the total amount of polymerization monomer dry materials added in the whole reaction process was 10.8 kg.

An elastomer emulsion was obtained, a coagulant was added for coagulation, and washing and vacuum drying were performed to finally obtain 10.2 kg of peroxide-cured fluororubber with a Mooney viscosity of 27.

This method required addition of a chain transfer agent and a large amount of initiator, and the method was repeated for several times. As a result, the Mooney viscosity of the product obtained fluctuated to 15 or even 44. However, when the method of Example 1 was repeated for several times, the result remained unchanged basically, and the fluctuation was within ±5.

Although the present invention has been described above in detail with general descriptions and specific embodiments, some modifications or improvements can be made on the basis of the present invention, which is apparent to a person skilled in the art. Therefore, all these modifications or improvements made without departing from the spirit of the present invention belong to the scope of protection of the present invention.

INDUSTRIAL APPLICABILITY

The present invention provides a method for controlling the Mooney viscosity of peroxide-cured fluororubber. The method comprises: adding an initiator solution in a continuous supplementary manner during the emulsion polymerization process of a peroxide-cured fluororubber until 5 to 10 minutes before the end of the polymerization reaction; wherein the amount of the initiator solution added initially is 0.1% to 0.5% of the total amount of the polymerization monomer dry materials, and the amount of the initiator solution continuously supplemented is 0.1% to 2% of the total amount of the polymerization monomer dry materials, based on the initiator. The present invention effectively controls the Mooney viscosity value of the peroxide-cured fluororubber within the desired range with small fluctuations by controlling the amount and the manner of addition of the initiator, and obtains a peroxide-cured fluororubber with stable and controllable quality. Moreover, the present invention does not need to add a chain transfer agent, which reduces the amount of additives in the polymerization process, and meanwhile improves the reactivity of the polymerization system, effectively shortens the time for polymerization, is beneficial to industrialized production, and has good economic value and application prospects.

What is claimed is:

1. A method for controlling Mooney viscosity of peroxide curable fluororubber, comprising:
    adding an initiator solution in a continuous supplementary manner during an emulsion polymerization process of a peroxide curable fluororubber until 5 to 10 minutes before the end of the polymerization reaction;
    wherein the initiator solution added initially comprises an initiator in an amount of 0.1 wt % to 0.5 wt % of the total amount of a polymerization monomer used during the emulsion polymerization process, wherein addition of the initiator solution initiates the polymerization reaction, and
    wherein the initiator solution is continuously supplemented after the initiator solution is initially added and comprises the initiator in a total amount of 0.1 wt % to 2 wt % based on the total amount of the polymerization monomer used during the emulsion polymerization process, and
    wherein the initiator solution is a 1 wt % to 8 wt % aqueous solution of the initiator and the initiator is ammonium persulfate or potassium persulfate, or a mixture thereof.

2. The method according to claim 1, wherein the initiator solution is 1 wt % to 5 wt % aqueous solution of the initiator.

3. The method according to claim 2, wherein the aqueous solution comprises deionized water and the temperature of the solution is adjusted to 25° C. to 35° C. when preparing the initiator solution.

4. The method according to claim 1, wherein the initiator consists of ammonium persulfate and potassium persulfate at a mass ratio of 2:1 to 5:1.

5. The method according to claim 1, wherein the emulsion polymerization process is performed at a temperature of 90° C. to 95° C. and under a pressure of 2.1 MPa to 2.5 MPa.

6. The method according to claim 1, wherein the initiator solution added initially comprises the initiator in an amount of 0.1 wt % to 0.5 wt % of the total amount of the polymerization monomer used during the emulsion polymerization process, and the initiator solution is continuously supplemented after the initiator solution is initially added and comprises the initiator in a total amount of 0.1 wt % to 0.3 wt % based on the total amount of the polymerization monomer used during the emulsion polymerization process.

7. The method according to claim 1, wherein the initiator solution added initially comprises the initiator in an amount of 0.1 wt % to 0.5 wt % of the total amount of the polymerization monomer used during the emulsion polymerization process, and the initiator solution is continuously supplemented after the initiator solution is initially added and comprises the initiator in a total amount of more than 0.3 wt % to 0.8 wt % of the total amount of the polymerization monomer used during the emulsion polymerization process.

8. The method according to claim 1, wherein the initiator solution added initially comprises the initiator in an amount of 0.1 wt % to 0.5 wt % of the total amount of the polymerization monomer used during the emulsion polymerization process, and the initiator solution is continuously supplemented after the initiator solution is initially added and comprises the initiator in a total amount of more than 0.8 wt % to 1.2 wt % of the total amount of the polymerization monomer used during the emulsion polymerization process.

9. The method according to claim 1, wherein the initiator solution added initially comprises the initiator in an amount of 0.1 wt % to 0.5 wt % of the total amount of the polymerization monomer used during the emulsion polymerization process, and the initiator solution is continuously supplemented after the initiator solution is initially added and comprises the initiator in a total amount of more than 1.2 wt % to 1.5 wt % of the total amount of the polymerization monomer used during the emulsion polymerization process.

10. The method according to claim 1, wherein the initiator solution added initially comprises the initiator in an amount of 0.1 wt % to 0.5 wt % of the total amount of the polymerization monomer used during the emulsion polymerization process, and the initiator solution is continuously supplemented after the initiator solution is initially added and comprises the initiator in a total amount of more than 1.5 wt % to 2.0 wt % of the total amount of the polymerization monomer used during the emulsion polymerization process.

11. The method according to claim 2, wherein the initiator consists of ammonium persulfate and potassium persulfate at a mass ratio of 2:1 to 5:1.

12. The method according to claim 3, wherein the initiator consists of ammonium persulfate and potassium persulfate at a mass ratio of 2:1 to 5:1.

13. The method according to claim 2, wherein the emulsion polymerization process is performed at a temperature of 90° C. to 95° C. and under a pressure of 2.1 MPa to 2.5 MPa.

14. The method according to claim 3, wherein the emulsion polymerization process is performed at a temperature of 90° C. to 95° C. and under a pressure of 2.1 MPa to 2.5 MPa.

15. The method according to claim 4, wherein the emulsion polymerization process is performed at a temperature of 90° C. to 95° C. and under a pressure of 2.1 MPa to 2.5 MPa.

16. The method according to claim 2, wherein the initiator solution added initially comprises the initiator in an amount of 0.1 wt % to 0.5 wt % of the total amount of the polymerization monomer used during the emulsion polymerization process, and the initiator solution is continuously supplemented after the initiator solution is initially added and comprises the initiator in a total amount of 0.1 wt % to 0.3 wt % based on the total amount of the polymerization monomer used during the emulsion polymerization process.

17. The method according to claim 2, wherein the initiator solution added initially comprises the initiator in an amount of 0.1 wt % to 0.5 wt % of the total amount of the polymerization monomer used during the emulsion polymerization process, and the initiator solution is continuously supplemented after the initiator solution is initially added and comprises the initiator in a total amount of more than 0.3 wt % to 0.8 wt % of the total amount of the polymerization monomer used during the emulsion polymerization process.

18. The method according to claim 2, wherein the initiator solution added initially comprises the initiator in an amount of 0.1 wt % to 0.5 wt % of the total amount of the polymerization monomer used during the emulsion polymerization process, and the initiator solution is continuously supplemented after the initiator solution is initially added and comprises the initiator in a total amount of more than 0.8 wt % to 1.2 wt % of the total amount of the polymerization monomer used during the emulsion polymerization process.

19. The method according to claim 2, wherein the initiator solution added initially comprises the initiator in an amount of 0.1 wt % to 0.5 wt % of the total amount of the polymerization monomer used during the emulsion polymerization process, and the initiator solution is continuously supplemented after the initiator solution is initially added and comprises the initiator in a total amount of more than 1.2 wt % to 1.5 wt % of the total amount of the polymerization monomer used during the emulsion polymerization process.

20. The method according to claim 2, wherein the initiator solution added initially comprises the initiator in an amount of 0.1 wt % to 0.5 wt % of the total amount of the polymerization monomer used during the emulsion polymerization process, and the initiator solution is continuously supplemented after the initiator solution is initially added and comprises the initiator in a total amount of more than 1.5 wt % to 2.0 wt % of the total amount of the polymerization monomer used during the emulsion polymerization process.

* * * * *